May 22, 1956 A. R. GROSS 2,746,771
AUTOMOBILE TOW BAR
Original Filed Jan. 11, 1951 2 Sheets-Sheet 2
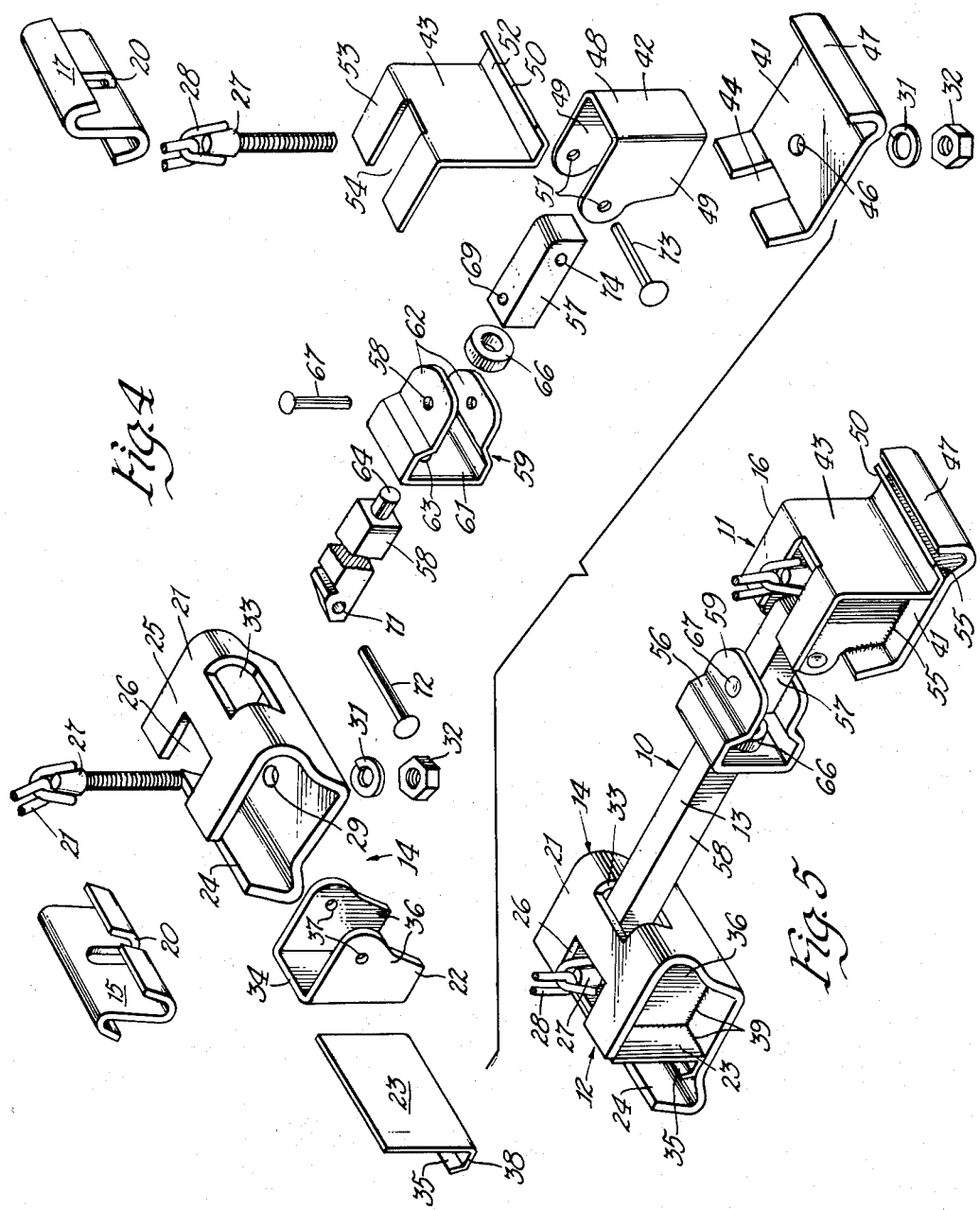
Inventor
Arthur R. Gross
by
Attorney United States Patent Office 2,746,771
Patented May 22, 1956

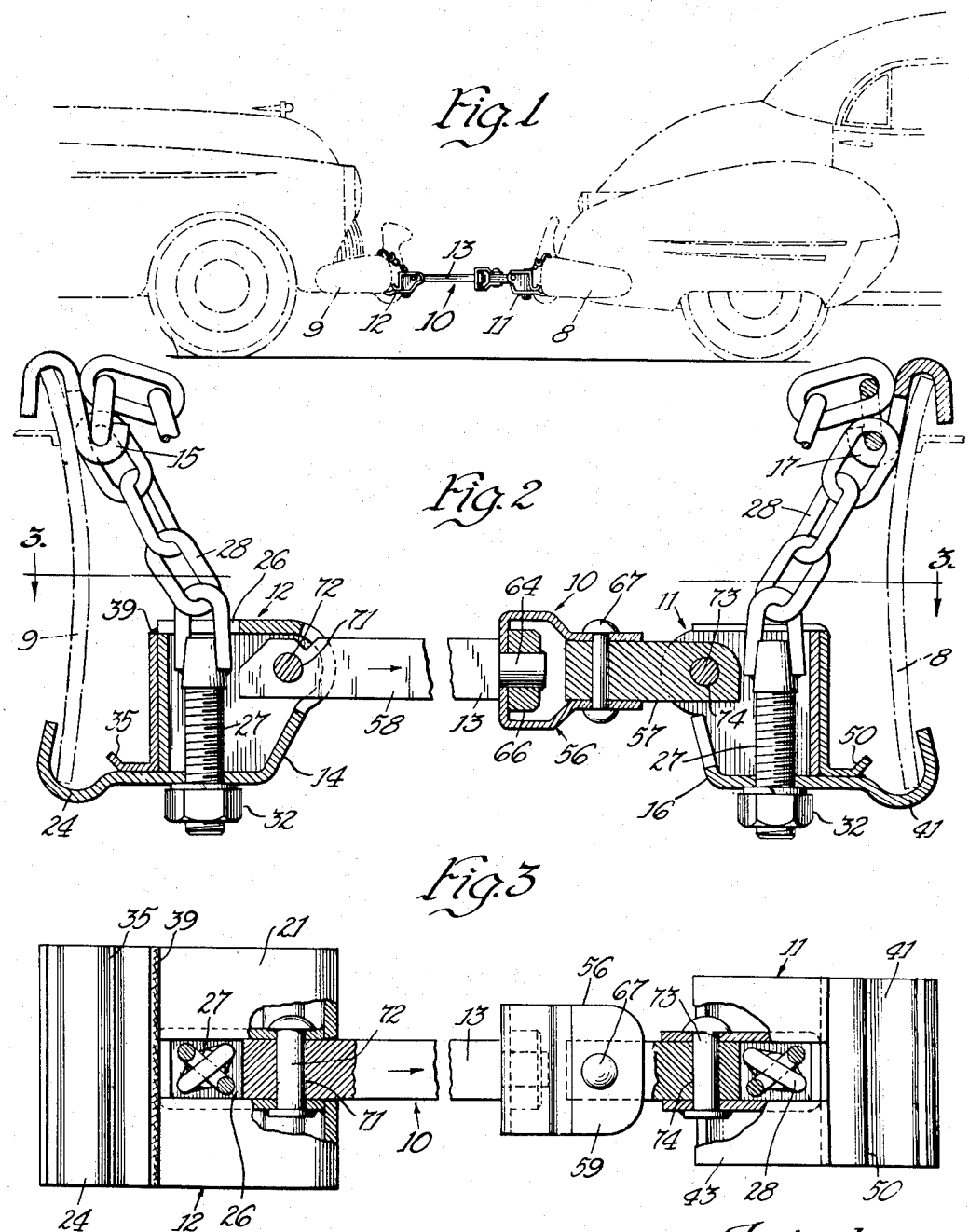

2,746,771
AUTOMOBILE TOW BAR

Arthur R. Gross, St. Paul, Minn., assignor, by mesne assignments, to Automatic Tow Bar Company, Inc., Minneapolis, Minn., a corporation of Minnesota Original application January 11, 1951, Serial No. 205,574, now Patent No. 2,672,353, dated March 16, 1954. Divided and this application May 27, 1953, Serial No. 357,791

2 Claims. (Cl. 280—494)

This invention relates to an improved automobile tow bar of the type adapted to relatively quick installation and particularly suitable for towing automobiles relatively short distances, as in intra-city and intra-state areas.

The present application is a division of my copending application, Serial No. 205,574, filed January 11, 1951 for Automobile Tow Bar, which application was issued on March 16, 1954 as Letters Patent No. 2,672,353.

A tow bar for use in towing automobiles for short distances is preferably characterized by quick and easy adjustment to vehicles, strength and safety in its operation, and being adapted to facilitate guiding the towed vehicle through city traffic. It is toward a tow bar having these features that this invention is directed.

One of the objects of my invention is to provide a tow bar of simplified design which is adapted to quick and efficient installation and removal from the towing and towed vehicles.

Another object of my invention is the provision of a tow bar in which the individual parts are inexpensively fabricated, but which, when assembled, produce a unit of unusual strength and safety.

A further object of my invention is a tow bar which is yieldable to the independent motion of the vehicles, but which increases the control and response of the towed vehicle, particularly as to steering.

A more specific object of my invention is to provide a tow bar with a universal joint action having improved strength and safety characteristics.

Further objects and advantages of the invention will be apparent from the following description and the accompanying drawings, in which similar characters of reference indicate similar parts throughout the several views.

In the drawings:

Fig. 1 is a side elevational view illustrating the installation and adaptation of a preferred embodiment of my invention as utilized for the towing of one automobile from another;

Fig. 2 is a vertical sectional view of the tow bar, drawn to a larger scale than Fig. 1, and depicting its attachment to automobile bumpers;

Fig. 3 is a plan view, partly in section, and viewed from a position indicated by line 3—3 of Fig. 2;

Fig. 4 is an exploded perspective view showing the component parts of the tow bar, shown in Figs. 1, 2 and 3; and Fig. 5 is a perspective view similar to Fig. 4, showing the component parts of the tow bar in assembled relationship.

In the preferred embodiment of the invention, as illustrated in the drawings, a tow bar 10 comprises a forward bumper clamp 11 and a rear bumper clamp 12 joined by connecting bar 13. The clamps 11 and 12 are adapted to engage the bumpers of the towing and towed vehicles; the bar 13, of course, furnishing the means of towing the rear vehicle. Although the clamps 11 and 12 are described and claimed in my aforesaid application Serial Number 205,574, it is believed necessary to a complete understanding of the present invention that the construction of said clamps be described here as well.

Each of the clamps 11 and 12 comprises a pair of clamp jaws, those of the rear clamp being indicated at 14 and 15, and those of the forward clamp being indicated at 16 and 17. The upper clamp jaws 15 and 17 are of flat plate stock formed into a substantially S-shape and provided with a chain slot 20, Fig. 4. Preferably, each of the lower clamp jaws 14 and 16 are of sturdier and more rigid construction than the upper jaws 15 and 17. This is because the lower jaws provide the towing connections to the connecting bar and must be held in an upright relationship with respect to the bumper of each vehicle so that a lever action of the connecting bar 13 may be effective. The upper and lower jaws of each clamp are connected together, in use by a chain and chain bolt arrangement, the chain engaging the upper clamp jaw and the chain bolt being secured to the lower clamp jaw.

The bumper clamps 11 and 12 are both subjected to the same general stress in straight pulling and, consequently, are of the same basic construction. However, the force necessary to secure adequate control over the rear vehicle, particularly in turning, makes it desirable to provide extra strength and rigidity in the rear clamp jaw 14. Such strength and rigidity is accomplished to a large extent by the design and relationship of the various component parts, which in themselves are simple and easily fabricated.

As shown in Fig. 4, the rear clamp jaw is made up of a jaw plate 21, a connecting plate 22, and a stiffening plate 23. The jaw plate 21 is formed from flat stock into a generally U-shape, one leg of which has a jaw portion 24 suitably curved to fit over and grip the edge of an automobile bumper. Another leg 25 of the jaw plate is recessed to provide an opening 26 adapted to receive the chain bolt 27 which is interlocked with a chain 28. In alignment with the opening 26 is an opening 29 in an opposed leg 30 of the jaw plate through which the chain bolt 27 extends and in which it is held by a nut 32 and accompanying lock washer 31. The jaw plate 21 is provided with another opening 33 through which the connecting bar 13 extends in the assembly.

The connecting plate 22 is also formed from flat stock into a generally U-shape having a flat web portion 34 and opposed wings 36. The size and shape of the plate 22 are made complementary to the inside of the jaw plate 21. The wings 36 of the connecting plate have aligned openings 37 therein for receiving a bolt, rivet, or the like, extending laterally of the clamp jaw. Stiffening plate 23 is a flat stock plate having one end 38 curved back upon itself to afford rigidity and to provide a lip 35 which, in the assembly, extends along the jaw portion 24, in spaced relationship thereto.

In assembling the rear clamp jaw 14 the connecting plate 22 is placed within the jaw plate 21 with the wings 36 approximately equidistantly spaced from opposite sides of the opening 33. The complementary fit of the plates 21 and 22 causes the edges of wings 36 and web portion 34 to fit snugly within the jaw plate. Stiffening plate 23 with its turned end 38 extending outwardly is then placed against the web portion 34 of the connecting plate. The plates are then rigidly secured together as by welded seams 39, along all of their adjacent surfaces.

The forward clamp jaw 16 is similar to the rear clamp jaw in that it has a jaw plate 41, yoke 42, and stiffening plate 43. The jaw plate 41 has a recess 44 therein for receiving the connecting bar 13, an opening 46 in the mid-portion thereof for receiving the chain bolt 27, and a jaw portion 47 for gripping the bumper of the forward vehicle. The yoke 42 is substantially U-shaped and has a flat web portion 48 and opposed wings 49; the wings having aligned openings 51 therein. The stiffening plate 43 includes a stiffening flange portion 52 integrally formed at one end thereof and terminating in an angularly disposed lip 50, and a cover portion 53 slotted to provide an opening 54 for receiving the chain bolt 27. The plates 41 and 43 and yoke 42 of the forward clamp jaw 16 are assembled and secured together by welded seams, such as 55, in a manner similar to that of the rear clamp jaw 14.

While the forward and rear clamp jaws are of the same basic design, it will be noted that the rear clamp jaw 14 is of sturdier and more rigid construction than is the forward jaw 16. This is done to provide wider lateral gripping action and greater strength and leverage for effecting control of the towed vehicle, particularly in turning corners and the like.

The forward and rear clamps 11 and 12 are connected together by connecting bar 13. The bar 13 has a coupling 56 intermediate its ends which divides the bar into two sections 57 and 58. The coupling 56 utilized in the preferred embodiment of the invention is of simple but sturdy design. It comprises a yoke 59 of general U-shape having a web portion 61 and wings 62 in spaced and opposed relationship. In the midportion of the web 61 is an opening 63 which rotatably receives a cylindrical end portion 64 on the forward end of the bar section 58 which is integral with and projects longitudinally from the bar section 58. A collar 66 is welded onto the end of the cylindrical end portion 64 of the bar section to secure that bar section to the yoke, while preserving the rotatable relationship between those connected parts. This rotational relationship of the bar sections eliminates torsional stress which would otherwise result from the relative tilting of connected vehicles during use of the tow bar.

The connecting bar section 57 is pivotally secured to the yoke 59 by a pin or rivet 67 which extends through aligned openings 68 and 69 in both the yoke and one end of the bar section. This pivotal connection constitutes a point of control of the rear vehicle as for effecting turning and the like. As the forward vehicle turns, the bar section 57 is moved out of lateral alignment with bar section 58, the continued pull of the forward vehicle forces the rear vehicle to turn and thereby effects return of the rear bar section 58 back into alignment with the forward bar section.

The position of the coupling with respect to the length of the connecting bar 13 has been found to be important in obtaining more effective control of towed vehicle. Although practical considerations dictate that the connecting bar shall be as short as possible, the rear bar section 58 must be of substantial length in order to provide leverage for forcing the rear vehicle to turn with practically instantaneous response to the controlling movements of the towing vehicle. It is with the foregoing considerations in mind that I have placed the coupling in the forward half of the bar 13. In this position, the action of the bar, when the forward vehicle is turning, is such that considerable leverage is exerted on the rear vehicle, because of the length of bar portion 58.

The connecting bar 13 is pivotally secured to both the front clamp jaw and the rear clamp jaw. In each instance, the axis of the pivotal connection of an end of the bar to one of the clamp jaws is horizontal when the tow bar is in use, so that flexibility in the plane steering forces is avoided, while the bar permits relative movements of the vehicles caused by unevenness of roads over which they pass. As shown in Figs. 2 and 3, the rear bar section 58 extends through opening 33 of the rear clamp jaw 14 and between the wings 36 of the connecting plate. An opening 71 in the bar section 58 is aligned between openings 37 in the plate; the bar section being secured in place by a pin 72. The forward bar section 57 is similarly secured to the forward clamp jaw 16 by pin 73 extending through opening 74 in the bar section and aligned openings 51 in the yoke 42. These pivotal connections of the bar 13 to the front and rear clamps 11 and 12 eliminate stress on the bar when the forward and rear vehicles are displaced vertically with respect to each other.

In the disclosed structure, front and rear clamps 11 and 12 are secured to the vehicle bumpers 8 and 9 by chain bolt 27 and chain 28 connecting the upper and lower clamp jaws of each clamp. In securing the rear clamp 11, as shown in Fig. 2, upper clamp jaw 15 is hooked over the upper edge of the vehicle bumper 9 and the jaw plate 21 of the lower clamp jaw is placed under the lower edge of the bumper. Chain bolt 27 is then placed through openings 26 and 29 of jaw 14 and the washer 31 and the nut 32 engaged thereon. The appropriate link of chain 28 giving the tightest fit is placed in slot 20, such link being held in place by the seating of the next upper link. The nut 32 of the chain bolt is then tightened until a rigid, non-slip engagement of the clamp to the bumper is effected. The front clamp 11 is similarly secured to the bumper 8 of the front vehicle. This arrangement of attaching the clamps permits instant and efficient securement of the tow bar to the vehicle bumper.

It is understood that the foregoing description is merely illustrative of a preferred embodiment of the invention and that the scope of the invention therefore is not to be limited thereto but is to be determined by the appended claims.

Having thus described my invention, what I claim as new and desire to secure by Letters Patent of the United States, is:

1. A coupling for a tow-bar or the like, said coupling comprising a yoke having a substantially flat web provided with a centrally disposed circular opening therein, and wings extending outwardly from the ends of the web, a bar section having a reduced cylindrical end portion extending through the opening in the web and into the space between the wings to provide a pivot for the web with respect to the bar section, means secured to the extending end of the bar section to retain said end in the opening in the web and to transmit an axial pull from the yoke to the bar section, a second bar section fitting between the wings of the yoke, a pin extending through the wings of the yoke and the second bar section and providing a transverse pivot connection between the yoke and second bar section, a second yoke having a substantially flat web provided with wings extending outwardly from the ends of the web and embracing the second bar section, and a pin extending through the wings of the yoke and the second bar section and providing a transverse pivot connection between the second yoke and second bar section disposed substantially 90° from the first pin in a plane parallel thereto.

2. The tow-bar coupling construction specified in claim 1, the wings of the first yoke being wider than the second bar section and more widely spaced at the regions within which the retaining means lies than at the regions within which the second bar section lies, whereby the retaining means provides no interference with relative pivoting of the yoke and the first bar section and the yoke wings embrace the second bar section to support it in a plurality of angular positions thereof with respect to the first bar section.

References Cited in the file of this patent

UNITED STATES PATENTS

| | | |
|---|---|---|
| 1,813,858 | Lambrecht | July 7, 1931 |
| 2,551,136 | Keltner | May 1, 1951 |
| 2,575,596 | Rettinger | Nov. 20, 1951 |

FOREIGN PATENTS

| | | |
|---|---|---|
| 623,962 | Great Britain | May 25, 1949 |